United States Patent
Kasada (10) Patent No.: US 9,721,606 B2
(45) Date of Patent: *Aug. 1, 2017

(54) MAGNETIC TAPE AND METHOD OF MANUFACTURING THE SAME

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/218,190

(22) Filed: Jul. 25, 2016

(65) Prior Publication Data

US 2017/0032812 A1    Feb. 2, 2017

(30) Foreign Application Priority Data

Jul. 28, 2015 (JP) .................................. 2015-148312

(51) Int. Cl.
| | |
|---|---|
| *G11B 5/71* | (2006.01) |
| *G11B 5/735* | (2006.01) |
| *G11B 5/84* | (2006.01) |
| *G11B 5/70* | (2006.01) |

(52) U.S. Cl.
CPC ............. *G11B 5/8404* (2013.01); *G11B 5/70* (2013.01); *G11B 5/71* (2013.01); *G11B 5/735* (2013.01)

(58) Field of Classification Search
None
See application file for complete search history.

(56) References Cited

U.S. PATENT DOCUMENTS

| | | | | | |
|---|---|---|---|---|---|
| 5,445,881 | A | * | 8/1995 | Irie ........................... | G11B 5/70 427/130 |
| 5,786,074 | A | * | 7/1998 | Soui ......................... | G11B 5/70 428/323 |
| 6,254,964 | B1 | * | 7/2001 | Saito ........................ | G11B 5/70 428/323 |
| 2001/0038928 | A1 | * | 11/2001 | Nakamigawa ........... | G11B 5/70 428/832.2 |
| 2003/0170498 | A1 | * | 9/2003 | Inoue ..................... | G11B 5/735 428/845.4 |
| 2009/0027812 | A1 | * | 1/2009 | Noguchi ............ | G11B 5/00826 360/324.11 |
| 2013/0029183 | A1 | * | 1/2013 | Omura ................... | G11B 5/735 428/844.8 |

(Continued)

FOREIGN PATENT DOCUMENTS

| | | |
|---|---|---|
| JP | 63-249932 A | 10/1988 |
| JP | 64-60819 A | 3/1989 |

*Primary Examiner* — Kevin Bernatz
(74) *Attorney, Agent, or Firm* — Sughrue Mion, PLLC (57) ABSTRACT

The magnetic tape has a magnetic layer containing ferromagnetic powder and binder on one surface of a nonmagnetic support, and has a backcoat layer containing nonmagnetic powder and binder on the other surface thereof, wherein the magnetic layer contains one or more components selected from the group consisting of a fatty acid and a fatty acid amide; the backcoat layer has a thickness of less than or equal to 0.30 μm and contains one or more components selected from the group consisting of a fatty acid and a fatty acid amide; a magnetic layer side C—H derived C concentration is greater than or equal to 45 atom %; and a backcoat layer side C—H derived C concentration is greater than or equal to 35 atom %.

16 Claims, 1 Drawing Sheet

(56) References Cited

U.S. PATENT DOCUMENTS

| | | | |
|---|---|---|---|
| 2016/0064025 A1* | 3/2016 | Kurokawa | G11B 5/71 428/840.4 |
| 2016/0093323 A1* | 3/2016 | Omura | G11B 5/733 428/840.3 |
| 2016/0189739 A1* | 6/2016 | Kasada | G11B 5/71 428/840 |
| 2016/0189740 A1* | 6/2016 | Oyanagi | G11B 5/71 428/840.4 |
| 2016/0247530 A1* | 8/2016 | Kasada | G11B 5/70605 |
| 2017/0032812 A1* | 2/2017 | Kasada | G11B 5/8404 |

* cited by examiner

US 9,721,606 B2

MAGNETIC TAPE AND METHOD OF MANUFACTURING THE SAME

CROSS-REFERENCE TO RELATED APPLICATIONS

This application claims priority under 35 U.S.0 119 to Japanese Patent Application No. 2015-148312 filed on Jul. 28, 2015. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes.

Magnetic tapes having backcoat layers (referred to as "back layers" in Japanese Unexamined Patent Publication (KOKAI) Showa No. 63-249932 and Japanese Unexamined Patent Publication (KOKAI) Heisei No. 1-60819, which are expressly incorporated herein by reference in their entirety) on the opposite surface of the nonmagnetic support from that on which the magnetic layer is present are disclosed in the above publications.

SUMMARY OF THE INVENTION

A magnetic tape is housed wound up on a reel within a magnetic tape cartridge. It is better to increase the overall length of the magnetic tape that is contained within a single magnetic tape cartridge to increase the recording capacity per magnetic tape cartridge. To that end, it is better to decrease the thickness of the magnetic tape (referred to as "thickness reduction", hereinafter).

An example of one way for thickness reduction of a magnetic tape is to reduce the thickness of the backcoat layer. In Japanese Unexamined Patent Publication (KOKAI) Showa No. 63-249932, the thickness of the backcoat layer is described as being less than or equal to 2.5 µm (claim 1 in Japanese Unexamined Patent Publication (KOKAI) Showa No. 63-249932) and the thickness of the backcoat layer in Examples is 2.0 µm. In Japanese Unexamined Patent Publication (KOKAI) Heisei No. 1-60819, the thickness of the backcoat layer is described as being less than or equal to 1.5 µm (claim 1 in Japanese Unexamined Patent Publication (KOKAI) Heisei No. 1-60819) and the thickness of the backcoat layer in Examples is 1.0 µm. However, with the demand for increased recording capacity in recent years has come a need to further reduce the thickness of the backcoat layer (referred to as "thickness reduction", hereinafter).

When the present inventor investigated how to achieve the thickness reduction of the backcoat layer, he discovered a marked phenomenon of damage to the edge portions of the magnetic tape (referred to as "edge damage", hereinafter) after running the magnetic tape on a drive, particularly in magnetic tapes in which the thickness of the backcoat layer had been reduced to less than or equal to 0.30 µm. This point will be described in greater detail. In the recording and reproduction of signals on a magnetic tape, a magnetic tape cartridge is placed in a drive and the magnetic tape within the magnetic tape cartridge is run. Since the magnetic tape is housed in a wound up state on reels within the magnetic tape cartridge as set forth above, the magnetic tape is fed out from and wound up on the reels during running. When irregular winding occurs, the edge of the magnetic tape strikes the flange or the like of the reels during winding, finally causing edge damage. This edge damage can cause an increase in errors during recording and a drop in running stability. Accordingly, it is desirable to reduce edge damage by inhibiting irregular winding (also referred to as "enhancing winding", hereinafter).

An aspect of the present invention provides for a magnetic tape having a backcoat layer the thickness of which has been reduced to less than or equal to 0.30 µm, with reduced edge damage.

An aspect of the present invention relates to a magnetic tape having a magnetic layer containing ferromagnetic powder and binder on one surface of a nonmagnetic support, and having a backcoat layer containing nonmagnetic powder and binder on the other surface thereof, wherein the magnetic layer contains one or more components selected from the group consisting of a fatty acid and a fatty acid amide;

the backcoat layer has a thickness of less than or equal to 0.30 µm and contains one or more components selected from the group consisting of a fatty acid and a fatty acid amide;

a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape, referred to as a magnetic layer side C—H derived C concentration, is greater than or equal to 45 atom %; and a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape, referred to as a backcoat layer side C—H derived C concentration, is greater than or equal to 35 atom %.

Although the above magnetic tape has a backcoat layer the thickness of which has been reduced to less than or equal to 0.30 µm, it is possible to inhibit the generation of edge damage. The present inventor presumes this to be due to the following.

X-ray photoelectron spectroscopy is an analysis method that is commonly referred to as electron spectroscopy for chemical analysis (ESCA) or X-ray photoelectron spectroscopy (XPS). Hereinafter, X-ray photoelectron spectroscopy will also be referred to as ESCA. ESCA is an analysis method that exploits the fact that photoelectrons are released when the surface of a sample being measured is irradiated with X-rays. It is widely employed as an analysis method for the surface layer portions of samples being measured. ESCA makes it possible to employ the X-ray photoelectron spectrum obtained by analysis of the surface of a sample being measured to conduct qualitative and quantitative analysis. Within the depth from the outer surface of the sample to the analysis position (also referred to hereinafter as the "detection depth") and the photoelectron take-off angle, the following equation generally holds true: detection depth is nearly equal to ≈ (nearly equal to) average free path of electrons ×3 ×sin θ. In the equation, the detection depth is the depth at which 95% of the photoelectrons constituting the X-ray photoelectron spectrum are generated and θ is the photoelectron take-off angle. From the above equation, it will be understood that the smaller the photoelectron take-off angle, the shallower the depth from the sample surface that can be analyzed, and the larger the photoelectron take-off angle, the deeper the depth from the surface that can be analyzed. In analysis by ESCA at a photoelectron take-off angle of 10 degrees, a surface layer portion of only several nm in depth from the surface of the sample is normally the position analyzed. Accordingly, analysis by ESCA conducted at a photoelectron take-off angle of 10 degrees on the surface of the magnetic tape on the magnetic layer side or the backcoat layer side permits compositional analysis of an extreme outer layer portion of only about several nm in depth from the surface of the magnetic tape on the magnetic layer side or the backcoat layer side.

Additionally, the C—H derived C concentration is the proportion that carbon atoms C constituting C—H bonds of organic compounds account for relative to the 100 atom % of the total (based on atoms) of all elements detected by qualitative analysis by ESCA. In the above magnetic tape, at least one component selected from the group consisting of a fatty acid and a fatty acid amide is contained respectively in the magnetic layer and the backcoat layer. The fatty acid and fatty acid amide are both components that can function as lubricants in magnetic tapes. In a magnetic tape containing at least one of the fatty acid and the fatty acid amide respectively in the magnetic layer and the backcoat layer, the C concentration derived from C—H determined by analysis by ESCA at a photoelectron take-off angle of 10 degrees is thought by the present inventor to be an indicator of the quantity of component (at least one component selected from the group consisting of a fatty acid and a fatty acid amide) on the extreme outer layer portion of the magnetic layer and the backcoat layer. This will be described in detail below. In an X-ray photoelectron spectrum (X-axis: bond energy; Y-axis: strength) obtained by ESCA analysis, the C1s spectrum contains information about the energy peak of the 1s orbital of carbon atoms C. In the C1s spectrum, the peak located in the vicinity of a bond energy of 284.6 eV is the C—H peak. This C—H peak is derived from the bond energy of the C—H bonds of organic compounds. In the extreme outer portion of the magnetic layer or the backcoat layer containing at least one component selected from the group consisting of a fatty acid and a fatty acid amide, the present inventor presumes that the main constituent component of the C—H peak is the component selected from the group consisting of a fatty acid and a fatty acid amide. The present inventor thus assumes that it can serve as an indicator of the quantity that is present, as set forth above.

In the present invention and present Specification, the C—H derived C concentration calculated from the C—H peak area ratio in the C1s spectrum obtained by X-ray photoelectron spectroscopy conducted at a photoelectron take-off angle of 10 degrees on a surface on the magnetic layer side will be denoted as the "magnetic layer side C—H derived C concentration", and the C—H derived C concentration calculated from the C—H peak area ratio in the C1s spectrum obtained by X-ray photoelectron spectroscopy conducted at a photoelectron take-off angle of 10 degrees on a surface on the backcoat layer side will be denoted as the "backcoat layer side C—H derived C concentration".

It became revealed based on investigation conducted by the present inventor that in a magnetic tape in which the magnetic layer side C—H derived C concentration was greater than or equal to 45 atom % and the backcoat layer side C—H derived C concentration was greater than or equal to 35 atom %, it was possible to inhibit edge damage even when the thickness of the backcoat layer was reduced to less than or equal to 0.30 μm. The present inventor assumes the following in this regard. Although merely a presumption, the present inventor assumes that the reason the edge damage phenomenon is pronounced when the thickness of the backcoat layer is reduced to less than or equal to 0.30 μm is that a reduction in the rigidity of the backcoat layer may cause poor contact between the surface on the magnetic layer side and the surface on the backcoat layer side during winding, resulting in winding displacement. By contrast, in a magnetic tape in which the magnetic layer and the backcoat layer each contain one or more components selected from the group consisting of a fatty acid and a fatty acid amide, and the magnetic layer side C—H derived C concentration and the backcoat layer side C—H derived C concentration fall within the ranges set forth above, a larger quantity of the one or more components selected from the group consisting of a fatty acid and a fatty acid amide is thought to be present than in a conventional magnetic tape. The present inventor assumes that as a result, there is good contact between the magnetic layer side surface and the backcoat layer side surface during winding, and winding displacement can be inhibited (winding is enhanced). By contrast, for example, above Japanese Unexamined Patent Publication (KOKAI) Showa No. 63-249932 discloses, in Examples, a magnetic tape containing one or more components selected from the group consisting of a fatty acid and a fatty acid amide in the magnetic layer and in the backcoat layer. However, based on investigation by the present inventor, merely incorporating these components into the magnetic layer and backcoat layer could not readily yield a magnetic tape in which the magnetic layer side C—H derived C concentration and the backcoat layer side C—H derived C concentration fall within the ranges set forth above.

The present inventor presumes the above to be why it is possible to inhibit edge damage despite the presence of a backcoat layer the thickness of which has been reduced to less than or equal to 0.30 μm. However, this is merely a presumption and is not intended to limit the present invention in any way.

In one embodiment, the magnetic layer side C—H derived C concentration falls within a range of 45 atom % to 80 atom %.

In one embodiment, the magnetic layer side C—H derived C concentration falls within a range of 45 atom % to 70 atom %.

In one embodiment, the backcoat layer side C—H derived C concentration falls within a range of 35 atom % to 60 atom %.

In one embodiment, the difference between the magnetic layer side C—H derived C concentration and the backcoat layer side C—H derived C concentration is less than or equal to 20 atom %. The above "difference" refers to the absolute value obtained by subtracting the one from the other. Either the magnetic layer side C—H derived C concentration or the backcoat layer side C—H derived C concentration can be larger than the other, or they can be identical. In one embodiment, the "magnetic layer side C—H derived C concentration <backcoat layer side C—H derived C concentration", and in another embodiment, the "magnetic layer side C—H derived C concentration >backcoat layer side C—H derived C concentration". In still another embodiment, the "magnetic layer side C—H derived C concentration =backcoat layer side C—H derived C concentration".

In one embodiment, the difference between the magnetic layer side C—H derived C concentration and the backcoat layer side C—H derived C concentration is less than or equal to 8 atom %.

In one embodiment, the nonmagnetic powder that is contained in the backcoat layer is nonmagnetic powder selected from the group consisting of carbon black and nonmagnetic inorganic oxide powder.

In one embodiment, the nonmagnetic powder contained in the backcoat layer contains at least carbon black.

In one embodiment, the above magnetic tape has a magnetic layer directly on the surface of the nonmagnetic support. In one embodiment, the magnetic tape has a magnetic layer on a nonmagnetic layer containing nonmagnetic powder and binder that is provided on the surface of the nonmagnetic support. That is, in one embodiment, the above magnetic tape has a nonmagnetic layer containing nonmagnetic powder and binder between the magnetic layer and the nonmagnetic support.

An aspect of the present invention relates to a method of manufacturing the above magnetic tape, which includes formation of a nonmagnetic layer, formation of a magnetic layer, and formation of a backcoat layer; wherein the formation of a nonmagnetic layer further includes:

coating a nonmagnetic layer-forming composition containing one or more components selected from the group consisting of a fatty acid and a fatty acid amide, nonmagnetic powder, binder, and solvent on the surface of a nonmagnetic support to form a coating layer;

heating and drying the coating layer by a heat treatment; and cooling the coating layer after the coating but prior to the heating and drying; and the formation of a backcoat layer further includes:

coating a backcoat layer-forming composition containing one or more components selected from the group consisting of a fatty acid and a fatty acid amide, nonmagnetic powder, binder, and solvent on the surface of a nonmagnetic support to form a coating layer;

heating and drying the coating layer by a heat treatment; and cooling the coating layer after the coating but prior to the heating and drying.

In one embodiment, the cooling in the formation of a backcoat layer is conducted by placing the coating layer in a cooling atmosphere of −10° C. to 0° C.

In one embodiment, the solvent that is contained in the backcoat layer-forming composition contains ketone solvent.

In one embodiment, the cooling in the forming of a nonmagnetic layer is conducted by placing the coating layer in a cooling atmosphere of −10° C. to 0° C.

In one embodiment, the solvent that is contained in the nonmagnetic layer-forming composition contains ketone solvent.

An aspect of the present invention can provide a magnetic tape having a backcoat layer the thickness of which is less than or equal to 0.30 μm, with reduced edge damage.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape of an aspect of the present invention is a magnetic tape having a magnetic layer containing ferromagnetic powder and binder on one surface of a nonmagnetic support, and having a backcoat layer containing nonmagnetic powder and binder on the other surface thereof, wherein the magnetic layer contains one or more components selected from the group consisting of a fatty acid and a fatty acid amide; the backcoat layer has a thickness of less than or equal to 0.30 μm and contains one or more components selected from the group consisting of a fatty acid and a fatty acid amide; the magnetic layer side C—H derived C concentration is greater than or equal to 45 atom %; and the backcoat layer side C—H derived C concentration is greater than or equal to 35 atom %.

The above magnetic tape will be described in greater detail below.

<Magnetic Layer Side C—H Derived C Concentration, Backcoat Layer Side C—H Derived C Concentration>

As set forth above, the magnetic layer side C—H derived C concentration and the backcoat layer side C—H derived C concentration are values that are determined by analysis by ESCA. The region analyzed is any 300 μm×700 μm region located on the surface on the magnetic layer side or the backcoat layer side of the magnetic tape. Qualitative analysis is conducted by wide scan measurement (pass energy: 160 eV; scan range: 0 to 1,200 eV; energy resolution: 1 eV/step) by ESCA. Next, the spectra of all the elements detected by qualitative analysis are subjected to narrow scan measurement (pass energy: 80 eV, energy resolution: 0.1 eV; scan range: set for each element so that the entire spectrum measured fits). The atomic concentration (unit: atom %) of each element is then calculated from the peak areas in the various spectra obtained. The atomic concentration (C concentration) of carbon atoms is then calculated from the peak area of the C1s spectrum.

Furthermore, C1s spectrum is obtained (pass energy: 10 eV; scan range: 276 eV to 296 eV; energy resolution: 0.1 eV/step). Fitting is conducted for the C1s spectrum by the nonlinear least squares method with Gauss-Lorentz complex function (Gauss component 70%, Lorentz component 30%). The proportion of the C—H peak accounted for by the C1s spectrum (peak area ratio) is calculated. The calculated C—H peak area ratio is multiplied by the above C to calculate the C—H derived C concentration.

The arithmetic average of values obtained by conducting the above processing at three different positions on the surface on the magnetic layer side of the magnetic tape is then adopted as the magnetic layer side C—H derived C concentration. The arithmetic average of values obtained by conducting the above processing at three different positions on the surface on the backcoat layer side of the magnetic tape is then adopted as the backcoat layer side C—H derived C concentration. The specific form of the above processing is given in Examples further below.

As will be described in detail further below, in one embodiment, the backcoat layer contains nonmagnetic powder in the form of carbon black. The carbon black contains carbon atoms. However, as set forth above, the backcoat layer side C—H derived C concentration is the ratio accounted for by carbon atoms C constituting C—H bonds in organic compounds. Accordingly, the present inventor presumes that the carbon atoms that are contained in carbon black do not contribute to the backcoat layer side C—H derived C concentration.

An example of one desirable means of adjusting to greater than or equal to 45 atom % the magnetic layer side C—H derived C concentration that is set forth above is to conduct cooling in the formation of a nonmagnetic layer, as will be described in detail further below. An example of one desirable means of adjusting to greater than or equal to 35 atom % the backcoat layer side C—H derived C concentration is to conduct cooling in the formation of a backcoat layer, as will be described in detail further below.

However, the magnetic tape of an aspect of the present invention is not limited to magnetic tapes that are manufactured by conducting cooling.

(Magnetic Layer Side C—H Derived C Concentration)

The magnetic layer side C—H derived C concentration of the magnetic tape is greater than or equal to 45 atom %. Based on investigation conducted by the present inventor, so long as the magnetic layer side C—H derived C concentration is greater than or equal to 45 atom %, regardless of how high the value, it is possible to inhibit edge damage in a magnetic tape having a backcoat layer that is less than or equal to 0.30 μm in thickness. For this reason, no upper limit is set for the magnetic layer side C—H derived C concentration. For example, the magnetic layer side C—H derived C concentration can be less than or equal to 95 atom %, less than or equal to 90 atom %, less than or equal to 85 atom %, less than or equal to 80 atom %, less than or equal to 75 atom %, or less than or equal to 70 atom %. The magnetic layer side C—H derived C concentration can be, for example, greater than or equal to 50 atom %, greater than or equal to 55 atom %, or greater than or equal to 60 atom %.

(Backcoat Layer Side C—H Derived C Concentration)

The backcoat layer side C—H derived C concentration of the magnetic tape is greater than or equal to 35 atom %. Based on investigation conducted by the present inventor, so long as the backcoat layer side C—H derived C concentration is greater than or equal to 35 atom %, regardless of how high the value, it is possible to inhibit edge damage in a magnetic tape having a backcoat layer that is less than or equal to 0.30 μm in thickness. For this reason, no upper limit is set for the backcoat layer side C—H derived C concentration. For example, the backcoat layer side C—H derived C concentration can be less than or equal to 95 atom %, less than or equal to 90 atom %, less than or equal to 85 atom %, less than or equal to 80 atom %, less than or equal to 75 atom %, less than or equal to 70 atom %, less than or equal to 65 atom %, or less than or equal to 60 atom %. The backcoat layer side C—H derived C concentration can be, for example, greater than or equal to 40 atom %, greater than or equal to 45 atom %, or greater than or equal to 50 atom %.

As described above, either the magnetic layer side C—H derived C concentration or the backcoat layer side C—H derived C concentration can be greater than the other, or they can be identical. From the perspective of further inhibiting edge damage to a magnetic tape having a backcoat layer that is less than or equal to 0.30 μm in thickness, the difference between the magnetic layer side C—H derived C concentration and the backcoat layer side C—H derived C concentration is desirably less than or equal to 20 atom %, preferably less than or equal to 15 atom %, more preferably less than or equal to 10 atom %, still more preferably less than or equal to 8 atom %, and yet more preferably, less than or equal to 5 atom %. There can be a difference of zero—that is, the magnetic layer side C—H derived C concentration can be identical to the backcoat layer side C—H derived C concentration.

<Fatty Acid and Fatty Acid Amide>

The above magnetic tape contains one or more components selected from the group consisting of a fatty acid and a fatty acid amide in each of the magnetic layer and backcoat layer. Just a fatty acid or just a fatty acid amide, or both, can be contained in the magnetic layer. Similarly, just a fatty acid or just a fatty acid amide, or both, can be contained in the backcoat layer. As set forth above, the present inventor assumes that when large quantities of these components are present in the far outer layer portions of the magnetic layer and the backcoat layer, they can contribute to inhibiting edge damage in a magnetic tape having a backcoat layer that is less than or equal to 0.30 μm in thickness. In the magnetic tape, a nonmagnetic layer containing nonmagnetic powder and binder can be present between the nonmagnetic support and magnetic layer. One or more components selected from the group consisting of a fatty acid and a fatty acid amide can be incorporated into the nonmagnetic layer, and such incorporation is desirable.

Examples of the fatty acid are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. The fatty acid can also be incorporated into the magnetic layer in the form of salts such as metal salts.

Examples of the fatty acid amide are amides of various fatty acids, such as amide laurate, amide myristate, amide palmitate, and amide stearate.

For the fatty acid and fatty acid derivatives (amides, esters described further below, and the like), the fatty acid derived moiety of a fatty acid derivative desirably has a structure that is identical or similar to that of the fatty acid which is employed together. As an example, when employing stearic acid as a fatty acid, it is desirable to employ amide stearate and/or stearic acid ester.

The quantity of fatty acid can be, for example 0.1 to 10.0 weight parts, desirably 1.0 to 7.0 weight parts, per 100.0 weight parts of ferromagnetic powder as the content in the magnetic layer-forming composition. When two or more different fatty acids are added to the magnetic layer-forming composition, the content refers to the combined content thereof. Unless specifically stated otherwise, this similarly applies to the contents of other components in this specification.

The content of fatty acid amide in the magnetic layer-forming composition can be, for example, 0.1 to 3.0 weight parts, desirably 0.1 to 1.0 weight parts, per 100.0 weight parts of ferromagnetic powder.

Additionally, the fatty acid content in the nonmagnetic layer-forming composition is, for example, 1.0 to 10.0 weight parts, desirably 1.0 to 7.0 weight parts, per 100.0 weight parts of nonmagnetic powder. The content of fatty acid amide in the nonmagnetic layer-forming composition is, for example, 0.1 to 3.0 weight parts, desirably 0.1 to 1.0 weight parts, per 100.0 weight parts of nonmagnetic powder.

The fatty acid content in the backcoat layer-forming composition is, for example, 0.1 to 10.0 weight parts, desirably 1.0 to 7.0 weight parts, per 100.0 weight parts of nonmagnetic powder contained in the backcoat layer.

The fatty acid amide content in the backcoat layer-forming composition is, for example, 0.1 to 3.0 weight parts, desirably 0.1 to 1.0 weight parts, per 100.0 weight parts of nonmagnetic powder.

<Fatty Acid Ester>

Either one, or both, of the magnetic layer and nonmagnetic layer, described in detail further below, can contain, or not contain, a fatty acid ester. Further, the backcoat layer can contain, or not contain, a fatty acid ester. The present inventor presumes that fatty acid esters do not affect (or affect only slightly) the inhibiting of edge damage in a magnetic tape having a backcoat layer that is less than or equal to 0.30 µm in thickness. Lubricants generally can be roughly divided into fluid lubricants and boundary lubricants. The fatty acid ester is a component that can function as fluid lubricants, while the fatty acid amide and the fatty acid are components that can function as boundary lubricants. Boundary lubricants are thought to be lubricants that adsorb to the surface of powder (such as ferromagnetic powder, nonmagnetic powder), forming a strong lubricating film that lowers contact friction. Conversely, fluid lubricants are thought to form a liquid film on the surface of the magnetic layer, with the flow of the liquid film that can reduce friction. It can be thought that the action of fatty acid esters differs from that of fatty acids and fatty acid amides as lubricants in this manner, and the present inventor assumes that this might be the reason for which fatty acid esters differ from fatty acids and fatty acid amides in their effects on inhibiting edge damage. Among the various lubricants, fatty acid esters are generally thought to be lubricants that can contribute to enhancing the running durability of magnetic tapes. Thus, fatty acid esters can be incorporated into any one or more layers from among the magnetic layer, backcoat layer, and nonmagnetic layer described in detail further below in order to enhance scratch-resistance, for example.

Examples of the fatty acid ester are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester is, for example, 0 to 10.0 weight parts, desirably 1.0 to 7.0 weight parts, per 100.0 weight parts of ferromagnetic powder as the content in the magnetic layer-forming composition.

The quantity of fatty acid ester is, for example, 0 to 10.0 weight parts, desirably 1.0 to 7.0 weight parts, per 100.0 weight parts of nonmagnetic powder as the content in the backcoat layer-forming composition.

When a nonmagnetic layer is present in the above magnetic tape, the quantity of fatty acid ester in the nonmagnetic layer, as the fatty acid ester content in the nonmagnetic layer-forming composition, is, for example, 0 to 10.0 weight parts, desirably 1.0 to 7.0 weight parts, per 100.0 weight parts of nonmagnetic powder.

The magnetic layer, backcoat layer, and the like of the above magnetic tape will be described next in greater detail.

<Magnetic Layer>

(Ferromagnetic Powder)

Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

In the present invention and in the present Specification, the term "powder" means an aggregation of multiple particles. The term "aggregation of multiple particles" is not limited to a state in which the constituent particles are in direct contact, but includes states in which binder, additives, and the like are present between the individual particles. The term "particle" is also sometimes used to denote powder.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

(Binder, Curing Agent)

The magnetic tape according to an aspect of the present invention is a particulate magnetic tape that contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the backcoat layer and in the nonmagnetic layer described further below. Reference can be made to paragraphs 0028 to 0031 of Japanese Unexamined Patent Publication (KOKAI) No. 2010-24113, which is expressly incorporated herein by reference in its entirety, with regard to the above binders.

Further, a curing agent can be employed along with the resin suitable for use as the binder. Polyisocyanate is suitable as the curing agent. Reference can be made to paragraphs 0124 to 0125 in Japanese Unexamined Patent Publication (KOKAI) No.2011-216149, for details regarding polyisocyanates. The curing agent can be added to the magnetic layer forming composition in a quantity of, for example, 0 to 80.0 weight parts, preferably 50.0 weight parts to 80.0 weight parts from the perspective of enhancing the coating strength, per 100.0 weight parts of binder.

(Additive)

Additives can be added to the magnetic layer as needed. Examples of additives are nonmagnetic fillers, dispersing agents, dispersion adjuvants, antifungal agents, antistatic agents, oxidation inhibitors, and carbon black. Examples of nonmagnetic fillers are nonmagnetic fillers that can function as abrasives and nonmagnetic fillers (such as nonmagnetic colloidal particles) that can function as protrusion-forming agents that form protrusions suitably protruding from the surface of the magnetic layer. These additives can be suitably selected from among commercial products and employed in any quantities based on the properties desired.

The magnetic layer set forth above can be provided directly, or indirectly over a nonmagnetic layer, on the surface of the nonmagnetic support. Details regarding the nonmagnetic layer and nonmagnetic support will be given further below.

<Nonmagnetic Layer>

The nonmagnetic layer will be described next. In the magnetic tape of an aspect of the present invention, a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

The fatty acid, fatty acid amide, and fatty acid ester that can be contained in the nonmagnetic layer are as set forth above. The binder, additives, dispersion method, and the like of the magnetic layer can also be applied to the nonmagnetic layer. In particular, techniques that are known with regard to the magnetic layer can be applied with regard to the quantity and type of binder and quantity and type of additives.

The nonmagnetic layer can be formed by coating and drying the nonmagnetic layer-forming composition on the nonmagnetic layer, the details of which will be described further below. Normally, one or more solvents are contained. Various organic solvents that are generally employed in the manufacturing of particulate magnetic recording media are examples of the solvent. Specifically, the following can be employed in any ratio: ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide; and hexane. Of these, from the perspective of solubility of the binders that are commonly employed in particulate magnetic recording media, one or more ketone solvent is desirably incorporated. The quantity of solvent in the nonmagnetic layer-forming composition is not specifically limited. The same quantity can be employed as in the nonmagnetic layer-forming composition of a common particulate magnetic recording medium.

Further, the description given above can be applied for solvents that can be incorporated in the various layer forming compositions such as the magnetic layer-forming composition and the backcoat layer-forming composition.

<Backcoat Layer>

The magnetic tape of an aspect of the present invention has a backcoat layer on the opposite surface of the nonmagnetic support from that on which the magnetic layer is present. As set forth above, the backcoat layer contains one or more components selected from the group consisting of a fatty acid and a fatty acid amide, and can optionally contain a fatty acid ester. Further, the backcoat layer contains nonmagnetic powder and binder in addition to these components, and can optionally contain known additives. Further details regarding the binder, additives, and the like of the backcoat layer can be determined by suitably applying known techniques relating to backcoat layers. It is also possible to apply known techniques relating to magnetic layers and nonmagnetic layers.

Reference can be made to the above description of the nonmagnetic powder of the nonmagnetic layer for the nonmagnetic powder of the backcoat layer. Either carbon black or a nonmagnetic powder other than carbon black, or both, can be employed as the nonmagnetic powder in the backcoat layer. It is desirable to either employ carbon black, or a combination of carbon black and a nonmagnetic powder other than carbon black. Examples of nonmagnetic powders other than carbon black are nonmagnetic inorganic powders. Specific examples are nonmagnetic inorganic powders such as iron oxides such as α-iron oxide, titanium oxides such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. Nonmagnetic inorganic oxide powders are desirable nonmagnetic inorganic powders. α-iron oxide and titanium oxide are preferred, and α-iron oxide is of greater preference.

The nonmagnetic powder other than carbon black can be acicular, spherical, polyhedral, or plate-like in shape. The average particle size of these nonmagnetic powders desirably falls within a range of 0.005 μm to 2.00 μm, preferably within a range of 0.01 μm to 0.20 μm. The specific surface area (BET specific surface area) of the nonmagnetic powder by the Brunauer-Emmett-Teller (BET) method desirably falls within a range of 1 $m^2/g$ to 100 $m^2/g$, preferably 5 $m^2/g$ to 70 $m^2/g$, and more preferably, within a range of 10 $m^2/g$ to 65 $m^2/g$. The average particle size of carbon black, for example, falls within a range of 5 nm to 80 nm, desirably 10 nm to 50 nm, and preferably, within a range of 10 nm to 40 nm. Reference can be made to the above description of the nonmagnetic powder in the nonmagnetic layer for the content (fill rate) of nonmagnetic powder in the backcoat layer. The carbon black content, for example, falls within a range of 10.0 weight parts to 100.0 weight parts per 100.0 weight parts of the total quantity of nonmagnetic powder. The entire quantity of nonmagnetic powder can be in the form of carbon black. The entire quantity of nonmagnetic powder can also be in the form of a nonmagnetic powder other than carbon black.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of Various Layers, Total Thickness of Magnetic Tape>

As regards the thickness of the nonmagnetic support and the various layers in the magnetic tape of an aspect of the present invention, the thickness of the nonmagnetic support is desirably 3.00 μm to 4.50 μm. The thickness of the magnetic layer can be optimized based on the magnetization saturation level of the magnetic head employed, the head gap length, and the recording signal band. Generally, it will be 0.01 μm to 0.15 μm. From the perspective of achieving higher density recording, it is desirably 0.02 μm to 0.12 μm, preferably 0.03 μm to 0.10 μm. A single magnetic layer suffices. The magnetic layer can be separated into two or more layers having differing magnetic properties. Known multilayer magnetic layer configurations can be applied.

The thickness of the nonmagnetic layer is, for example, 0.10 μm to 1.50 μm, and desirably 0.10 μm to 1.00 μm. When the magnetic tape of an aspect of the present invention has a nonmagnetic layer, the nonmagnetic layer may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

The backcoat layer is less than or equal to 0.30 µm, desirably 0.10 µm to 0.30 µm, in thickness.

From the perspective of enhancing the recording capacity of a magnetic tape, it is desirable to reduce the thickness of the magnetic tape to increase the recording capacity per magnetic tape cartridge. From this perspective, the total thickness of the magnetic tape of an aspect of the present invention is desirably less than or equal to 6.00 µm. From the perspective of the ease of handling (handling properties) of the magnetic tape, the total thickness of the magnetic tape is desirably greater than or equal to 1.00 µm.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

<Manufacturing Process>

(Preparation of Composition for Forming Each Layer)

Compositions (coating liquids) for forming the magnetic layer, backcoat layer and the nonmagnetic layer normally contain solvent in addition to the various components set forth above. Details of the solvent are described above. The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, fatty acid, fatty acid amide, binder, various optionally added additives, solvent, and the like that are employed in the present invention can be added at the start, or part way through, any of these steps. An individual starting material can be divided for addition in two or more steps. For example, it is possible to separately disperse the abrasive from the ferromagnetic powder in preparing the magnetic layer-forming composition. Separate dispersion is desirable. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step, Cooling Step, and Heating and Drying Step)

The magnetic layer can be formed by coating directly on the nonmagnetic support, or by multilayer coating the magnetic layer-forming composition either successively or simultaneously with the nonmagnetic layer forming composition. Reference can be made to Japanese Unexamined Patent Publication (KOKAI) No. 2010-231843, paragraph 0066, for details regarding coating to form the various layers. The content of the above publication is expressly incorporated herein by reference in its entirety.

In a desirable embodiment, the magnetic tape of an aspect of the present invention is manufactured by sequential multilayer coating. The manufacturing process in sequential multilayer coating is desirably conducted as follows. The nonmagnetic layer is formed by a coating step of forming a coating layer by coating the nonmagnetic layer-forming composition on a nonmagnetic support and a heating and drying step of heat treating the coating layer that has been formed to dry it. The magnetic layer is then formed by a coating step of forming a coating layer by coating the magnetic layer-forming composition on the nonmagnetic layer that has been formed and a heating and drying step of heat treating the coating layer that has been formed to dry it.

In such a manufacturing method by sequential multilayer coating, it is desirable to conduct the step of forming the nonmagnetic layer with a nonmagnetic layer-forming composition containing one or more components selected from the group consisting of a fatty acid and a fatty acid amide in the coating step, and to conduct a cooling step of cooling the coating layer between the coating step and the heating and drying step to adjust the magnetic layer side C—H derived C concentration to greater than or equal to 45 atom % in a magnetic tape containing one or more components selected from the group consisting of a fatty acid and a fatty acid amide in the magnetic layer. The reason for this is unclear. However, the present inventor presumes that cooling the coating layer of the nonmagnetic layer-forming composition prior to the heating and drying step can facilitate the migration of these components (fatty acid, fatty acid amide) to the nonmagnetic layer surface during volatization of the solvent in the drying and heating step. However, this is merely a presumption and is not intended to limit the present invention in any way.

In the process of forming the magnetic layer, a coating step of forming a coating layer by coating a magnetic layer-forming composition containing ferromagnetic powder, binder, and solvent on the nonmagnetic layer can be conducted, and a heating and drying step of drying the coating layer that has been formed by subjecting it to a heat treatment can be conducted. The magnetic tape of an aspect of the present invention contains one or more components selected from the group consisting of a fatty acid and a fatty acid amide in the magnetic layer. To manufacture such a magnetic tape, it is desirable for the magnetic layer-forming composition to contain one or more components selected from the group consisting of a fatty acid and a fatty acid amide. However, it is not necessary for the magnetic layer-forming composition to contain one or more components selected from the group consisting of a fatty acid and a fatty acid amide. This is because it is conceivable to form a magnetic layer containing one or more components selected from the group consisting of a fatty acid and a fatty acid amide by incorporating these components into a nonmagnetic layer-forming composition, having them migrate to the surface of the nonmagnetic layer, and then coating a magnetic layer-forming composition over this nonmagnetic layer to form a magnetic layer.

The backcoat layer is formed on the opposite surface of the nonmagnetic support from the surface on which the magnetic layer is formed (or is to be formed). The backcoat layer is desirably formed by a coating step of forming a coating layer by coating a backcoat layer-forming composition on the surface of the nonmagnetic support and then conducting a heating and drying step to dry by a heat treatment the coating layer that has been formed.

It is desirable to conduct the above coating step of forming a backcoat layer using a backcoat layer-forming composition containing one or more components selected from the group consisting of a fatty acid and a fatty acid amide, and to conduct the cooling step of cooling the coating layer between the coating step and the heating and drying step so as to adjust the backcoat layer side C—H derived C concentration to greater than or equal to 35 atom % in a magnetic tape having a backcoat layer containing one or more components selected from the group consisting of a fatty acid and a fatty acid amide. Although the reason for this is unclear, the present inventor presumes that cooling the coating layer of the backcoat layer-forming composition prior to the heating and drying step can facilitate the migration of these components (fatty acid, fatty acid amide) to the backcoat layer surface during volatization of the solvent in the drying and heating step. However, this is merely a presumption and is not intended to limit the present invention in any way.

That is, an aspect of the present invention relates to a method of manufacturing the magnetic tape of an aspect of the present invention, which includes formation of a nonmagnetic layer, formation of a magnetic layer, and formation of a backcoat layer; wherein the formation of a nonmagnetic layer further includes:
coating a nonmagnetic layer-forming composition containing one or more components selected from the group consisting of a fatty acid and a fatty acid amide, nonmagnetic powder, binder, and solvent on the surface of a nonmagnetic support to form a coating layer;
heating and drying the coating layer by a heat treatment; and
cooling the coating layer after the coating but prior to the heating and drying; and the formation of a backcoat layer further includes:
coating a backcoat layer-forming composition containing one or more components selected from the group consisting of a fatty acid and a fatty acid amide, nonmagnetic powder, binder, and solvent on the surface of a nonmagnetic support to form a coating layer;
heating and drying the coating layer by a heat treatment; and
cooling the coating layer after the coating but prior to the heating and drying.

A specific embodiment of the manufacturing method will be described below based on FIG. 1. However, the present invention is not limited to the specific embodiment given below.

Figure 1:
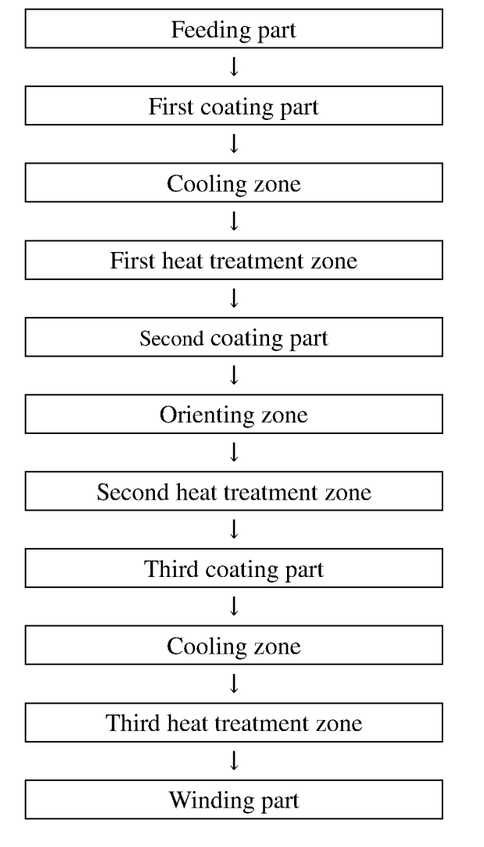
FIG. 1 shows an example (a schematic process diagram) of a specific embodiment of the process of manufacturing a magnetic tape.

FIG. 1 is a schematic process diagram showing a specific embodiment of the steps of manufacturing a magnetic tape having a backcoat layer on the other surface of a nonmagnetic support from that on which are sequentially present a nonmagnetic layer and a magnetic layer. In the embodiment shown in FIG. 1, a nonmagnetic support (long film) is continuously subjected to an operation of being fed by a feeding part and being wound up in a winding part. In various parts or various zones shown in FIG. 1, various processes such as coating, drying, and orienting can be conducted to form by sequential multilayer coating a nonmagnetic layer and a magnetic layer on one surface of a nonmagnetic support that is running, and a backcoat layer can be formed on the other surface. With the exception of comprising a cooling zone, the manufacturing process can be identical to the one that is commonly conducted to manufacture a particulate magnetic recording medium such as a magnetic tape.

In a first coating part, the nonmagnetic layer-forming composition is coated on the nonmagnetic support that has been fed from the feeding part (step of coating the nonmagnetic layer coating composition).

After the above coating step, the coating layer of the nonmagnetic layer-forming composition that has been formed in the coating step is cooled in a cooling zone (cooling step). For example, the cooling step can be conducted by having the nonmagnetic support on which the coating layer has been formed pass through a cooling atmosphere. The temperature of the cooling atmosphere desirably falls within a range of −10° C. to 0° C., preferably within a range of −5° C. to 0° C. The duration of the cooling step (for example, the time from when some portion of the coating layer is conveyed into the cooling zone to when it is conveyed out, also referred to as the "residence time" hereinafter) is not specifically limited. However, the longer it is, the higher the magnetic layer side C—H derived C concentration tends to be. Thus, it is desirable adjusted, for example, based on preliminary testing based on the necessity of achieving the magnetic layer side C—H derived C concentration of greater than or equal to 45 atom %. In the cooling step, a cooled gas can be blown onto the surface of the coating layer.

After the cooling zone, in the first heat treatment zone, the coating layer following the cooling step is dried by being heated (heating and drying step). The heating and drying step can be conducted by causing the nonmagnetic support on which the coating layer is present following the cooling step to pass through a heating atmosphere. Here, the temperature of the heating atmosphere is, for example, about 60° C. to 140° C. However, any temperature that will dry the coating layer by evaporating the solvent will do, and there is no limit to the above range. A heated gas can be optionally blown onto the surface of the coating layer. The same holds true for the heating and drying step in the second heat treatment zone and the heating and drying step in the third heat treatment zone, described further below.

In the second coating part, the magnetic layer-forming composition is coated on the nonmagnetic layer that has been formed by the heating and drying step in the first heat treatment zone (magnetic layer-forming composition coating step).

Subsequently, while the coating layer of the magnetic layer-forming composition is still wet, a step of orienting the ferromagnetic powder in the coating layer is conducted in an orienting zone. Reference can be made to Japanese Unexamined Patent Publication (KOKAI) No. 2010-231843, paragraph 0067, with regard to orientation processing.

The coating layer following the orientation processing is subjected to a heating and drying step in a second heat treatment zone.

Then, in a third coating part, a backcoat layer-forming composition is coated to the surface on the opposite side of the nonmagnetic support from the surface on which the nonmagnetic layer and magnetic layer have been formed to form a coating layer (the backcoat layer-forming composition coating step).

Following the coating step, the coating layer of the backcoat layer-forming composition that has been formed in the coating step is cooled (cooling step following coating of the backcoat layer-forming composition). For example, the cooling step can be conducted by passing the nonmagnetic support on which the coating layer has been formed through a cooling atmosphere. The temperature of the cooling atmosphere desirably falls within a range of −10° to 0° C., preferably within a range of −5° C. to 0° C. The duration (residence time) of the cooling step is not specifically limited. The longer it is made, the greater the backcoat layer side C—H derived C concentration tends to become. It is desirably adjusted by conducting preliminary testing as needed to achieve a backcoat layer side C—H derived C concentration of greater than or equal to 35 atom %. In the cooling step, it is also possible to blow a cooled gas onto the surface of the coating layer.

Subsequently, in a third heat treatment zone, the coating layer is dried by a heat treatment following the above cooling step.

A magnetic tape sequentially having on one surface of a nonmagnetic support a nonmagnetic layer and a magnetic layer and having a backcoat layer on the other surface thereof can be obtained as set forth above. The magnetic tape obtained can be wound up on a winding element and then subjected to various optional post-processing (various surface processing and the like, such as calendering). This post-processing can be applied without limitation in the form of known techniques relating to the manufacturing of particulate magnetic recording media such as magnetic tapes. Reference can be made, for example, to Japanese Unexamined Patent Publication (KOKAI) No. 2010-231843, paragraph 0069, with regard to the cutting step that is normally conducted following various optional post-processing.

The magnetic tape of an aspect the present invention set forth above has a backcoat layer that is less than or equal to 0.30 μm in thickness and can undergo little edge damage. In recent years, higher speed recording has become the direction of development. This has been accompanied by increased running speeds (also referred to as conveyance speeds) in magnetic tapes running in drives. In general, since irregular winding tends to occur as the speed increases, edge damage tends to occur. By contrast, the magnetic tape of an aspect of the present invention as set forth above makes it possible to inhibit edge damage. Accordingly, the magnetic tape of an aspect of the present invention is capable of responding to increased recording speeds. For example, it is capable of running speeds of greater than or equal to 3 m/s, desirably greater than or equal to 5 m/s—for example, 5 to 20 m/s. However, it is not limited to this range. The magnetic tape of an aspect of the present invention can be run at various running speeds and can be suitably used to record and reproduce signals.

EXAMPLES

The present invention will be described in greater detail below through Examples. However, the present invention is not limited to the embodiments shown in Examples. The "parts" and "percent (%)" indicated below denote "weight parts" and "weight percent (%)".

The weight average molecular weights given below are values obtained by measurement by gel permeation chromatography (GPC) under the following conditions with polystyrene conversion.

GPS device: HLC-8120 (made by Tosoh)
Column: TSK gel Multipore HXL-M (made by Tosoh, 7.8 mm ID (inner diameter)×30.0 cm)
Eluent: Tetrahydrofuran (THF)

Examples 1 to 17, Comparative Examples 1 to 13

1. Preparation of Alumina (Abrasive) Dispersion

To 100.0 parts of alumina powder (HIT-80 made by Sumitomo Chemical Co.) with an alpha conversion rate of about 65% and a BET specific surface area of 20 m$^2$/g were admixed 3.0 parts of 2,3-dihydroxynaphthalene (made by Tokyo Kasei), 31.3 parts of a 32% solution (in a solvent in the form of a mixed solvent of methyl ethyl ketone and toluene) of polyester polyurethane resin (UR-4800 made by Toyobo (Japanese registered trademark) with polar groups in the form of SO$_3$Na groups (polar group quantity: 80 meq/kg)), and 570.0 parts of a solvent in the form of a mixed solution of 1:1 (weight ratio) methyl ethyl ketone and cyclohexanone. The mixture was dispersed for 5 hours in a paint shaker in the presence of zirconia beads. Following dispersion, the dispersion and the beads were separated with a mesh, yielding an alumina dispersion.

2. Formula of Magnetic Layer Forming Composition

| (Magnetic liquid) | |
|---|---|
| Ferromagnetic powder | 100.0 parts |
| Ferromagnetic hexagonal barium ferrite powder or ferromagnetic metal powder (see Table 5) | |
| Polyurethane resin containing SO$_3$Na groups | 14.0 parts |
| Weight average molecular weight: 70,000; SO$_3$Na groups: 0.2 meq/g | |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (average particle size 120 nm) | 2.0 parts |
| Methyl ethyl ketone | 1.4 parts |
| (Other components) | |
| Stearic acid | See Table 5 |
| Amide stearate | See Table 5 |
| Butyl stearate | See Table 5 |
| Polyisocyanate | 2.5 parts |
| (Coronate (Japanese registered trademark) made by Nippon Polyurethane Industry Co., Ltd. | |
| (Finishing solvents) | |
| Cyclohexanone | 200.0 parts |
| Methyl ethyl ketone | 200.0 parts |

In Table 5, BF denotes ferromagnetic barium ferrite powder with an average particle size (average plate diameter) of 21 nm and MP denotes ferromagnetic metal powder with an average particle size (average major axis length) of 30 nm.

3. Formula of Nonmagnetic Layer Forming Composition

| | |
|---|---|
| Nonmagnetic inorganic powder: α-iron oxide | 100.0 parts |
| Average particle size (average major axis length): 0.15 μm | |
| Average acicular ratio: 7 | |
| BET specific surface area: 52 m$^2$/g | |
| Carbon black | 20.0 parts |
| Average particle size: 20 nm | |
| Polyurethane resin containing SO$_3$Na groups | 18.0 parts |
| Weight average molecular weight: 70,000 SO$_3$Na groups: 0.2 meq/g | |
| Stearic acid | See Table 5 |
| Amide stearate | See Table 5 |
| Butyl stearate | See Table 5 |
| Cyclohexanone | 300.0 parts |
| Methyl ethyl ketone | 300.0 parts |

4. Formula of Backcoat Layer Forming Composition

| | |
|---|---|
| Nonmagnetic inorganic powder: α-iron oxide | See Table 5 |
| Average particle size (average major axis length): 0.15 μm | |
| Average acicular ratio: 7 | |
| BET specific surface area: 52 m$^2$/g | |
| Carbon black | See Table 5 |
| Average particle size 20 nm | |
| Vinyl chloride copolymer | 13.0 parts |
| Polyurethane resin containing sulfonate groups | 6.0 parts |
| Phenylphosphonic acid | 3.0 parts |
| Stearic acid | See Table 5 |
| Amide stearate | See Table 5 |
| Butyl stearate | See Table 5 |
| Cyclohexanone | 155.0 parts |

| | |
|---|---|
| Methyl ethyl ketone | 155.0 parts |
| Polyisocyanate | 5.0 parts |
| Cyclohexanone | 200.0 parts |

5. Preparing Compositions for Forming Various Layers

A magnetic layer-forming composition was prepared by the following method. The above magnetic liquid was prepared by dispersing (bead dispersing) the various components in a batch-type vertical sand mill for 24 hours. Zirconia beads with a bead diameter of 0.5 mmΦ were employed as dispersion beads. The magnetic liquid that had been prepared and the above abrasive liquid were mixed with the other components (silica sol, other components, and finishing solvents) in the above sand mill and bead dispersed for 5 minutes, after which the mixture was processed (ultrasonically dispersed) for 0.5 minutes in a batch-type ultrasonic device (20 kHz, 300 W). Subsequently, a filter having an average pore diameter of 0.5 µm was used to conduct filtration and prepare a magnetic layer-forming composition.

The nonmagnetic layer-forming composition was prepared by the following method. The various components—excluding the stearic acid, cyclohexanone, and methyl ethyl ketone —were dispersed for 24 hours in a batch-type vertical sand mill to obtain a dispersion. Zirconia beads with a bead diameter of 0.5 mmΦ were employed as dispersion beads. Subsequently, the remaining components were added to the dispersion that had been obtained and the mixture was stirred in a dissolver. The dispersion thus obtained was filtered with a filter having an average pore diameter of 0.5 µm to prepare a nonmagnetic layer-forming composition.

The backcoat layer-forming composition was prepared by the following method. The various components—excluding the polyisocyanate and cyclohexanone—were kneaded in an open kneader and diluted, after which a horizontal bead mill disperser was used to conduct 12 dispersion processing passes, each pass consisting of a residence time of 2 minutes, at a rotor tip peripheral speed of 10 m/s using zirconia beads with a bead diameter of 1 mmΦ at a bead fill rate of 80 volume %. Subsequently, the remaining components were added to the dispersion obtained and the mixture was stirred in a dissolver. The dispersion thus obtained was filtered with a filter having an average pore diameter of 1 µm to prepare a backcoat layer-forming composition.

6. Magnetic Tape Fabrication

Magnetic tapes were fabricated based on the specific embodiments shown in FIG. 1. The details are given below.

A polyethylene naphthalate support (nonmagnetic support) of the thickness indicated in Table 5 was fed by a feeding part. The nonmagnetic layer-forming composition prepared in 5. above was coated on one surface thereof so as to yield the thickness upon drying indicated in Table 5 in a first coating part, forming a coating layer. While the coating layer that had been formed was still wet, a cooling step of passage through a cooling zone adjusted to an atmospheric temperature of 0° C. for the residence time indicated in Table 5 was conducted, after which a heating and drying step of passage through a first heat treatment zone with an atmospheric temperature of 100° C. was conducted to form a nonmagnetic layer.

Subsequently, the magnetic layer-forming composition prepared in 5. above was coated on the surface of the nonmagnetic layer in a second coating part so as to yield the thickness upon drying indicated in Table 5 to form a coating layer. While this coating layer was still wet (not yet dry), a magnetic field with a magnetic strength of 0.3 T was applied perpendicularly with respect to the surface of the coating layer of the magnetic layer-forming composition in an orienting zone to conduct perpendicular orientation processing, after which drying was conducted in a second heat treatment zone (atmospheric temperature 100° C.).

Subsequently, the backcoat layer-forming composition prepared in 5. above was coated on the opposite surface of the polyethylene naphthalate support (nonmagnetic support) from that on which the nonmagnetic layer and magnetic layer had been formed in a third coating part so as to yield the dry thickness indicated in Table 5 to form a coating layer. While the coating layer that had been formed was still wet, a cooling step of passage through a cooling zone adjusted to an atmospheric temperature of 0° C. for the residence time indicated in Table 5 was conducted, after which the coating layer was dried in a third heat treatment zone (atmospheric temperature 100° C.).

Subsequently, calendering (surface smoothing processing) at a temperature of 100° C., a linear pressure of 300 kg/cm, and a speed of 80 m/min was conducted in a calender comprised solely of metal rolls, after which a heat treatment was conducted for 36 hours in an environment with an atmospheric temperature of 70° C. Following the heat treatment, the product was slit to ½ inch (0.0127 meter) width to obtain a magnetic tape.

In the comparative examples in which "Not implemented" is recorded in Table 5 in the column for the cooling zone residence time following coating of the nonmagnetic layer-forming composition, magnetic tapes were fabricated by a manufacturing process that did not include the above cooling zone. In the comparative examples in which "Not implemented" is recorded in Table 5 in the column for the cooling zone residence time following coating of the backcoat layer-forming composition, magnetic tapes were fabricated by a manufacturing process that did not include the above cooling zone.

The thickness of the various layers of the magnetic tapes that had been fabricated and the nonmagnetic support as well as the total thickness was determined by the following method. The various thicknesses were confirmed to be the thickness indicated in Table 5.

The cross section of the magnetic tapes in the direction of thickness was exposed by ion beam, and observation of the exposed cross section was conducted by a scanning electron microscope. In observing the cross section, the various thicknesses were obtained as the arithmetic average of thicknesses obtained in two spots in the direction of thickness.

[Evaluation Methods]

1. Magnetic Layer Side C—H Derived C Concentration, Backcoat Layer Side C—H Derived C Concentration X-ray photoelectron spectroscopy was conducted with an ESCA device on the magnetic layer side surface (measurement region: 300 µm×700 µm) of the magnetic tapes of Examples and Comparative Examples by the following method. The magnetic layer side C—H derived C concentration was calculated from the analysis results. The calculated values are given in Table 5.

X-ray photoelectron spectroscopy was conducted with an ESCA device on the backcoat layer side surface (measurement region: 300 µm×700 µm) of the magnetic tapes of Examples and Comparative Examples by the following method. The backcoat layer side C—H derived C concentration was calculated from the analysis results. The calculated values are given in Table 5.

(Analytic and Calculation Methods)

The measurements of (1) to (3) below were all conducted under the conditions shown in Table 1.

TABLE 1

| Device | AXIS-ULTRA made by Shimadzu Corp. |
|---|---|
| Excitation X-ray source | Monochromatized Al-Kα radiation (output: 15 kV, 20 mA) |
| Analyzer mode | Spectrum |
| Lens mode | Hybrid (analysis area: 300 μm x 700 μm) |
| Neutralizing electron gun for charge compensation (charge neutralizer) | On (used) |
| Photoelectron take-off angle | 10 deg. or 90 deg. (angle of device relative to sample surface) |

(1) Wide Scan Measurement

The types of elements detected by wide scan measurement (measurement conditions: see Table 2) by ESCA on the magnetic layer side surface and on the backcoat layer side surface of the magnetic tape were examined (qualitative analysis).

TABLE 2

| Scan range | Pass energy | Energy resolution (step) | Pickup time (Dwell) | Cumulative number (Sweeps) |
|---|---|---|---|---|
| 0 to 1200 eV | 160 eV | 1 eV/step | 100 ms/step | 5 |

(2) Narrow Scan Measurement

Narrow scan measurement (measurement conditions: see Table 3) was conducted for each of the elements detected in (1) above. The auxiliary data processing software of the device (Vision 2.2.6) was employed to calculate the atomic concentration (unit: atom %) of each element detected in the peak areas of the various elements. The C concentration was also calculated from the peak area of the C1s spectrum.

TABLE 3

| Spectrum[Note 1] | Scan range | Pass energy | Energy resolution (Step) | Pickup time (Dwell) | Cumulative number (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] The spectrum (type pf element) shown in Table 3 is an example. When an element that is not shown in Table 3 was detected in the qualitative analysis of (1), identical narrow scan measurements were conducted over a scan range containing all of the spectra of elements detected.
[Note 2] For spectra with good signal-to-noise (S/N) ratios, measurements were taken a total of three times. However, the quantitative results were not affected for any of the spectra when measurements were taken a total of five times.

4. Obtaining the C 1s Spectrum

C1s spectra were obtained under the measurement conditions given in Table 4. The auxiliary data processing software (Vision 2.2.6) of the device was used to compensate for the shift (physical shift) due to the sample charge in the C1s spectrum obtained. The same software was then used to conduct fitting (peak separation) of the C1s spectrum. In peak separation, a Gauss-Lorentz complex function (Gauss component 70%, Lorentz component 30%) was employed, fitting of the C1s spectrum was conducted by the nonlinear least squares method, and the proportion of the C—H peak accounted for by the C1s spectrum (peak area ratio) was calculated. The calculated C—H peak area ratio was multiplied by the C concentration obtained in (2) above to calculate the C—H derived C concentration.

TABLE 4

| Spectrum | Scan range | Pass energy | Energy resolution (Step) | Pickup time (Dwell) | Cumulative number (Sweeps) |
|---|---|---|---|---|---|
| C1s | 276 to 296 eV | 10 eV | 0.1 eV/step | 200 ms/step | 20 |

The arithmetic average of values obtained by conducting the above processing three times at different positions on the magnetic layer side surface of the magnetic tape was adopted as the magnetic layer side C—H derived C concentration.

The arithmetic average of values obtained by conducting the above processing three times at different positions on the backcoat layer side surface of the magnetic tape was adopted as the backcoat layer side C—H derived C concentration.

The values calculated are given in Table 5.

2. Determining the Contribution of Fatty Acid and Fatty Acid Amide to the C—H Derived C Concentration (1) Two magnetic tapes (sample tapes) were fabricated by the same method as in Example 1. One of the sample tapes was measured with the above ESCA device, and the other was solvent extracted (solvent: methanol) in an unmeasured state.

Gas chromatography analysis of the quantities of the fatty acid, fatty acid amide, and fatty acid ester in the solutions obtained by extraction revealed almost no differences in the quantitative values of the two sample tapes for the fatty acid (stearic acid) and fatty acid amide (amide stearate). However, the quantitative value of the fatty acid ester (butyl stearate) in the sample tape following measurement was markedly lower than in the unmeasured sample tape. This was attributed to the fatty acid ester having volatized in the vacuum chamber in which the sample being measured was placed during measurement in the ESCA device.

Based on the above results, the fatty acid ester was determined not to have affected the magnetic layer side C—H derived C concentration and the backcoat layer side C—H derived C concentration obtained by analysis by ESCA.

(2) Excluding solvents and polyisocyanate (which was crosslinked with other components by the heat treatment), the organic compounds among the components contained in the backcoat layer-forming composition were stearic acid, amide stearate, butyl stearate, vinyl chloride copolymer, polyurethane resin, and phenylphosphonic acid. Of these components, as set forth above, the butyl stearate was determined not to affect the backcoat layer side C—H derived C concentration based on the results of (1) above.

The effects of vinyl chloride copolymer, polyurethane resin, and phenylphosphonic acid on the backcoat layer side C—H derived C concentration were determined next by the following method.

For the vinyl chloride copolymer, polyurethane resin, and phenylphosphonic acid employed in Example 1, a C1s spectrum was obtained by the same method as above. The peak positioned in the vicinity of a bond energy of 286 eV and the C—H peak were separated by the processing set forth above for the peaks obtained. The proportion accounted for by the various separated peaks in the C1s spectrum (peak area ratios) were calculated, and the ratio of the area of the peak in the vicinity of a bond energy of 286 eV to the C—H peak was calculated.

Next, in the C1s spectrum obtained in the measurement on the backcoat layer side surface of Example 1, the peaks positioned in the vicinity of a bond energy of 286 eV were separated by the processing set forth above. While vinyl chloride copolymer, polyurethane resin, and phenylphosphonic acid have peaks in the vicinity of a bond energy of 286 eV in the C1s spectrum, fatty acid (stearic acid) and fatty acid amide (amide stearate) do not. Accordingly, the peaks positioned in the vicinity of a bond energy of 286 eV in the C1s spectrum obtained in the measurement on the backcoat layer side surface of Example 1 were determined to have been derived from vinyl chloride copolymer, polyurethane resin, and phenylphosphonic acid. Accordingly, using these peaks, based on the ratio of the peak areas calculated above, the contribution of vinyl chloride copolymer, polyurethane resin, and phenylphosphonic acid to the C—H peak of the C1s spectrum obtained in the measurement on the backcoat layer side surface of Example 1 was calculated to be only about 10%. Based on these results, the greater part (about 90%) of the C—H peak in the C1s spectrum obtained in the measurement on the backcoat layer side surface of Example 1 was determined to have been derived from fatty acid (stearic acid) and fatty acid amide (amide stearate).

Based on these results, the backcoat layer side C—H derived C concentration was demonstrated to be an indicator of the quantity of fatty acid and fatty acid amide present.

(3) Components contained in the magnetic layer-forming composition and components that are contained in the nonmagnetic layer-forming composition and may migrate from the nonmagnetic layer to the magnetic layer in a magnetic tape and can thus be present in the magnetic layer are organic compounds excluding solvents and polyisocyanate (being crosslinked by any of treatments with heating) in the form of stearic acid, amide stearate, butyl stearate, 2,3-dihydroxynaphthalene, and polyurethane resin. Of these components, butyl stearate, as stated above, has been determined not to affect the magnetic layer side C—H derived C concentration based on the results of (1) above.

The effects of 2,3-dihydroxynaphthalene and polyurethane resin on the magnetic layer side C—H derived C concentration were determined next by the following method.

For the 2,3-dihydroxynaphthalene and polyurethane resin employed in Example 1, a C1s spectrum was obtained by the same method as above. The peak positioned in the vicinity of a bond energy of 286 eV and the C—H peak were separated by the processing set forth above for the peaks obtained. The proportion accounted for by the various separated peaks in the C1s spectrum (peak area ratios) were calculated, and the ratio of the area of the peak in the vicinity of a bond energy of 286 eV to the C—H peak was calculated.

Next, in the C1s spectrum obtained in the measurement on the magnetic layer side surface of Example 1, the peaks positioned in the vicinity of a bond energy of 286 eV were separated by the processing set forth above. While 2,3-dihydroxynaphthalene and polyurethane resin have peaks in the vicinity of a bond energy of 286 eV in the C1s spectrum, fatty acid (stearic acid) and fatty acid amide (amide stearate) do not. Accordingly, the peaks positioned in the vicinity of a bond energy of 286 eV in the C1s spectrum obtained in the measurement on the magnetic layer side surface of Example 1 were determined to have been derived from 2,3-dihydroxynapththalene and polyurethane resin. Accordingly, using these peaks, based on the ratio of the peak areas calculated above, the contribution of 2,3-dihydroxynaphthalene and polyurethane resin to the C—H peak of the C1s spectrum obtained in the measurement on the magnetic layer side surface of Example 1 was calculated to be only about 10%. Based on these results, the greater part (about 90%) of the C—H peak in the C1s spectrum obtained in the measurement on the magnetic layer side surface of Example 1 was determined to have been derived from fatty acid (stearic acid) and fatty acid amide (amide stearate).

Based on these results, the magnetic layer side C—H derived C concentration was demonstrated to be an indicator of the quantity of fatty acid and fatty acid amide present.

3. Evaluation of Edge Damage

Magnetic tape cartridges housing the various magnetic tapes (overall magnetic tape length: 500 m) of Examples and Comparative Examples were placed in linear tape-open generation 5 (LTO-G5) drives made by IBM and the magnetic tapes were run back and forth 1,500 times at a running speed of 5 m/s at a tension of 0.6 N.

Following this running, the magnetic tape cartridges were placed in a reference drive (LTO-G5 drive made by IBM) and the magnetic tapes were run to conduct recording and reproduction. The reproduced signals during running were picked up by an external analog/digital (AD) converter, a signal in which the reproduced signal amplitude dropped by greater than or equal to 70% relative to the average (the average of the values measured for each track) in each of the two tracks nearest the edges of the magnetic tape was treated as a missing pulse, the frequency of occurrence (number of occurrences) thereof was divided by the overall length of the magnetic tape, and the missing pulse occurrence frequency per unit length of magnetic tape (per meter) (referred to hereinafter as the "number of missing pulses") was calculated.

The greater the severity of edge damage, the higher the number of missing pulses obtained by the above method. Accordingly, the number of missing pulses obtained by the above method is an indicator of edge damage. The number of missing pulses of less than or equal to 10.0/m was determined to indicate that edge damage had been kept to a practically adequate level. Since the position at which edge damage occurred was not constant, in the present evaluation, the greater of the results of measurement in the track nearest one edge and the results of measurement in the track nearest the other edge was adopted as the number of missing pulses that is given in Table 5.

The above results are given in Table 5.

TABLE 5

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Ferromagnetic powder | | BF | BF | BF | BF | BF | MP | BF | BF |
| Magnetic layer thickness | | 0.10 μm | 0.10 μm | 0.10 μm | 0.10 μm | 0.10 μm | 0.10 μm | 0.10 μm | 0.10 μm |
| Nonmagnetic layer thickness | | 1.00 μm | 1.00 μm | 0.50 μm | 0.10 μm | 0.10 μm | 0.10 μm | 1.00 μm | 1.00 μm |
| Nonmagnetic support thickness | | 4.30 μm | 4.30 μm | 4.30 μm | 4.30 μm | 3.60 μm | 3.60 μm | 4.30 μm | 4.30 μm |
| Backcoat layer thickness | | 0.30 μm | 0.20 μm | 0.20 μm | 0.20 μm | 0.20 μm | 0.20 μm | 0.30 μm | 0.30 μm |
| Total thickness of magnetic tape | | 5.70 μm | 5.60 μm | 5.10 μm | 4.70 μm | 4.00 μm | 4.00 μm | 5.70 μm | 5.70 μm |
| Residence time in cooling zone after coating nonmagnetic layer-forming composition | | 1 sec | 1 sec | 1 sec | 1 sec | 1 sec | 1 sec | 1 sec | 1 sec |
| Residence time in cooling zone after coating backcoat layer-forming composition | | 1 sec | 1 sec | 1 sec | 1 sec | 1 sec | 1 sec | 1 sec | 1 sec |
| Magnetic layer-forming composition | Stearic acid/part | 2.0 | 2.0 | 2.0 | 2.0 | 2.0 | 2.0 | 6.0 | 2.0 |
| | Amide stearate/part | 0.2 | 0.2 | 0.2 | 0.2 | 0.2 | 0.2 | 1.0 | 0.2 |
| | Butyl stearate/part | 2.0 | 2.0 | 2.0 | 2.0 | 2.0 | 2.0 | 2.0 | 2.0 |
| Nonmagnetic layer-forming composition | Stearic acid/part | 2.0 | 2.0 | 2.0 | 2.0 | 2.0 | 2.0 | 6.0 | 2.0 |
| | Amide stearate/part | 0.2 | 0.2 | 0.2 | 0.2 | 0.2 | 0.2 | 1.0 | 0.2 |
| | Butyl stearate/part | 2.0 | 2.0 | 2.0 | 2.0 | 2.0 | 2.0 | 2.0 | 2.0 |
| Backcoat layer-forming composition | α-iron oxide/part | 80.0 | 80.0 | 80.0 | 80.0 | 80.0 | 80.0 | 80.0 | 50.0 |
| | Carbon black/part | 20.0 | 20.0 | 20.0 | 20.0 | 20.0 | 20.0 | 20.0 | 50.0 |
| | Stearic acid/part | 2.0 | 2.0 | 2.0 | 2.0 | 2.0 | 2.0 | 6.0 | 2.0 |
| | Amide stearate/part | 0.2 | 0.2 | 0.2 | 0.2 | 0.2 | 0.2 | 1.0 | 0.2 |
| | Butyl stearate/part | 2.0 | 2.0 | 2.0 | 2.0 | 2.0 | 2.0 | 2.0 | 2.0 |
| Magnetic layer side C—H derived C concentration | | 45 atom % | 45 atom % | 45 atom % | 45 atom % | 45 atom % | 45 atom % | 47 atom % | 45 atom % |
| Backcoat layer side C—H derived C concentration | | 35 atom % | 35 atom % | 35 atom % | 35 atom % | 35 atom % | 35 atom % | 36 atom % | 36 atom % |
| Number of missing pulses, per meter(/m) | | 3.8 | 4.3 | 4.7 | 5.1 | 5.9 | 6.5 | 4.2 | 3.8 |

|  |  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Ferromagnetic powder | | BF | BF | BF | BF | BF | BF | BF | BF | BF |
| Magnetic layer thickness | | 0.10 μm | 0.10 μm | 0.10 μm | 0.10 μm | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm | 1.00 μm | 1.00 μm | 1.00 μm | 1.00 μm |
| Nonmagnetic support thickness | | 4.30 μm | 4.30 μm | 4.30 μm | 4.30 μm | 4.30 μm | 4.30 μm | 4.30 μm | 4.30 μm | 4.30 μm |
| Backcoat layer thickness | | 0.30 μm | 0.30 μm | 0.30 μm | 0.30 μm | 0.30 μm | 0.30 μm | 0.30 μm | 0.30 μm | 0.30 μm |
| Total thickness of magnetic tape | | 5.70 μm | 5.70 μm | 5.70 μm | 5.70 μm | 5.70 μm | 5.70 μm | 5.70 μm | 5.70 μm | 5.70 μm |
| Residence time in cooling zone after coating nonmagnetic layer-forming composition | | 1 sec | 5 sec | 180 sec | 1 sec | 1 sec | 1 sec | 1 sec | 1 sec | 1 sec |
| Residence time in cooling zone after coating backcoat layer-forming composition | | 1 sec | 5 sec | 180 sec | 5 sec | 10 sec | 180 sec | 1 sec | 1 sec | 1 sec |
| Magnetic layer-forming composition | Stearic acid/part | 2.0 | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 | 0.0 |
| Nonmagnetic layer-forming composition | Stearic acid/part | 2.0 | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 | 2.0 |
| Backcoat layer-forming composition | α-iron oxide/part | 0.0 | 80.0 | 80.0 | 80.0 | 80.0 | 80.0 | 80.0 | 80.0 | 80.0 |
| | Carbon black/part | 100.0 | 20.0 | 20.0 | 20.0 | 20.0 | 20.0 | 20.0 | 20.0 | 20.0 |
| | Stearic acid/part | 2.0 | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 0.0 | 4.0 | 2.0 |

TABLE 5-continued

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Magnetic layer side C—H derived C concentration | 45 atom % | 55 atom % | 70 atom % | 45 atom % | 45 atom % | 45 atom % | 45 atom % | 45 atom % | 45 atom % |
| Backcoat layer side C—H derived C concentration | 36 atom % | 40 atom % | 60 atom % | 40 atom % | 45 atom % | 60 atom % | 35 atom % | 35 atom % | 35 atom % |
| Number of missing pulses, per meter(/m) | 3.8 | 3.4 | 3.3 | 2.9 | 2.7 | 3.7 | 3.8 | 3.8 | 3.8 |

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Ferromagnetic powder | | BF | BF | BF | BF | BF | BF | MP | BF |
| Magnetic layer thickness | | 0.10 μm | 0.10 μm | 0.10 μm | 0.10 μm | 0.10 μm | 0.10 μm | 0.10 μm | 0.10 μm |
| Nonmagnetic layer thickness | | 1.00 μm | 0.50 μm | 0.10 μm | 1.00 μm | 1.00 μm | 0.10 μm | 0.10 μm | 1.00 μm |
| Nonmagnetic support thickness | | 4.30 μm | 4.30 μm | 4.30 μm | 3.80 μm | 3.40 μm | 3.40 μm | 3.40 μm | 4.30 μm |
| Backcoat layer thickness | | 0.60 μm | 0.60 μm | 0.60 μm | 0.60 μm | 0.60 μm | 0.60 μm | 0.60 μm | 0.40 μm |
| Total thickness of magnetic tape | | 6.00 μm | 5.50 μm | 5.10 μm | 5.50 μm | 5.10 μm | 4.20 μm | 4.20 μm | 5.80 μm |
| Residence time in cooling zone after coating nonmagnetic layer-forming composition | | Not implemented | Not implemented | Not implemented | Not implemented | Not implemented | Not implemented | Not implemented | Not implemented |
| Residence time in cooling zone after coating backcoat layer-forming composition | | Not implemented | Not implemented | Not implemented | Not implemented | Not implemented | Not implemented | Not implemented | Not implemented |
| Magnetic layer-forming composition | Stearic acid/part | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Nonmagnetic layer-forming composition | Stearic acid/part | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Backcoat layer-forming composition | α-iron oxide/part | 80.0 | 80.0 | 80.0 | 80.0 | 80.0 | 80.0 | 80.0 | 80.0 |
| | Carbon black/part | 20.0 | 20.0 | 20.0 | 20.0 | 20.0 | 20.0 | 20.0 | 20.0 |
| | Stearic acid/part | 2.0 | 2.0 | 2.0 | 2.0 | 2.0 | 2.0 | 2.0 | 2.0 |
| | Amide stearate/part | 0.2 | 0.2 | 0.2 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Magnetic layer side C—H derived C concentration | | 35 atom % | 35 atom % | 35 atom % | 35 atom % | 35 atom % | 35 atom % | 35 atom % | 35 atom % |
| Backcoat layer side C—H derived C concentration | | 25 atom % | 25 atom % | 25 atom % | 25 atom % | 25 atom % | 25 atom % | 25 atom % | 25 atom % |
| Number of missing pulses, per meter(/m) | | 3.2 | 4.1 | 6.2 | 3.9 | 5.8 | 7 | 7.4 | 4.3 |

| | | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|
| Ferromagnetic powder | | BF | BF | BF | BF | BF | BF | BF | BF |
| Magnetic layer thickness | | 0.10 μm | 0.10 μm | 0.10 μm | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm | 1.00 μm | 1.00 μm | 1.00 μm |
| Nonmagnetic support thickness | | 4.30 μm | 4.30 μm | 4.30 μm | 4.30 μm | 4.30 μm | 4.30 μm | 4.30 μm | 4.30 μm |
| Backcoat layer thickness | | 0.30 μm | 0.20 μm | 0.30 μm | 0.30 μm | 0.30 μm | 0.30 μm | 0.30 μm | 0.30 μm |
| Total thickness of magnetic tape | | 5.70 μm | 5.60 μm | 5.70 μm | 5.70 μm | 5.70 μm | 5.70 μm | 5.70 μm | 5.70 μm |
| Residence time in cooling zone after coating nonmagnetic layer-forming composition | | Not implemented | Not implemented | Not implemented | Not implemented | 50 sec | 180 sec | Not implemented | Not implemented |
| Residence time in cooling zone after coating backcoat layer-forming composition | | Not implemented | Not implemented | Not implemented | Not implemented | Not implemented | Not implemented | 50 sec | 180 sec |
| Magnetic layer-forming composition | Stearic acid/part | 2.0 | 2.0 | 6.0 | 2.0 | 2.0 | 2.0 | 2.0 | 2.0 |
| | Amide stearate/part | 0.2 | 0.2 | 1.0 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Nonmagnetic layer-forming composition | Stearic acid/part | 2.0 | 2.0 | 6.0 | 2.0 | 2.0 | 2.0 | 2.0 | 2.0 |
| | Amide stearate/part | 0.2 | 0.2 | 1.0 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Backcoat layer-forming composition | α-iron oxide/part | 80.0 | 80.0 | 80.0 | 0.0 | 80.0 | 80.0 | 80.0 | 80.0 |
| | Carbon black/part | 20.0 | 20.0 | 20.0 | 100.0 | 20.0 | 20.0 | 20.0 | 20.0 |
| | Stearic acid/part | 2.0 | 2.0 | 6.0 | 2.0 | 2.0 | 2.0 | 2.0 | 2.0 |
| | Amide stearate/part | 0.2 | 0.2 | 1.0 | 0.2 | 0.2 | 0.2 | 0.2 | 0.2 |
| | Butyl stearate/part | 2.0 | 2.0 | 2.0 | 2.0 | 2.0 | 2.0 | 2.0 | 2.0 |
| Magnetic layer side C—H derived C concentration | | 35 atom % | 35 atom % | 38 atom % | 35 atom % | 65 atom % | 70 atom % | 35 atom % | 35 atom % |
| Backcoat layer side C—H derived C concentration | | 25 atom % | 25 atom % | 25 atom % | 25 atom % | 25 atom % | 25 atom % | 48 atom % | 60 atom % |
| Number of missing pulses, per meter(/m) | | 13.8 | 16.4 | 13.5 | 14.2 | 17.1 | 17.3 | 15.3 | 16.6 |

The following determinations can be made based on the results given in Table 5.

(1) In the magnetic tapes of Comparative Examples 1 to 8 in which the thickness of the backcoat layer exceeded 0.30

μm, even when the magnetic layer side C—H derived C concentration was less than 45 atom % and the backcoat layer side C—H derived C concentration was less than 35%, the number of missing pulses was less than or equal to 10.0/m. That is, in a magnetic tape in which the backcoat layer exceeded 0.30 μm in thickness, no correlation was observed between the occurrence of edge damage and the magnetic layer side C—H derived C concentration and the backcoat layer side C—H derived C concentration.

(2) By contrast, based on a comparison of Examples 1 to 17 and Comparative Examples 9 to 16, in magnetic tapes in which the backcoat layer was less than or equal to 0.30 μm in thickness, keeping the magnetic layer side C—H derived C concentration to greater than or equal to 45 atom % and the backcoat layer side C—H derived C concentration to greater than or equal to 35 atom % was determined to inhibit edge damage.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
   which comprises a magnetic layer comprising ferromagnetic powder and binder on one surface of a nonmagnetic support, and comprises a backcoat layer comprising nonmagnetic powder and binder on the other surface of the nonmagnetic support,
   wherein the magnetic layer comprises one or more components selected from the group consisting of a fatty acid and a fatty acid amide;
   the backcoat layer has a thickness of less than or equal to 0.30 μm and comprises one or more components selected from the group consisting of a fatty acid and a fatty acid amide;
   a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape, referred to as a magnetic layer side C—H derived C concentration, is greater than or equal to 45 atom %; and
   a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape, referred to as a backcoat layer side C—H derived C concentration, is greater than or equal to 35 atom %.

2. The magnetic tape according to claim 1,
   wherein the magnetic layer side C—H derived C concentration falls within a range of 45 atom % to 80 atom %.

3. The magnetic tape according to claim 1,
   wherein the magnetic layer side C—H derived C concentration falls within a range of 45 atom % to 70 atom %.

4. The magnetic tape according to claim 1,
   wherein the backcoat layer side C—H derived C concentration falls within a range of 35 atom % to 60 atom %.

5. The magnetic tape according to claim 2,
   wherein the backcoat layer side C—H derived C concentration falls within a range of 35 atom % to 60 atom %.

6. The magnetic tape according to claim 3,
   wherein the backcoat layer side C—H derived C concentration falls within a range of 35 atom % to 60 atom %.

7. The magnetic tape according to claim 1,
   wherein a difference between the magnetic layer side C—H derived C concentration and the backcoat layer side C—H derived C concentration is less than or equal to 20 atom %.

8. The magnetic tape according to claim 1,
   wherein a difference between the magnetic layer side C—H derived C concentration and the backcoat layer side C—H derived C concentration is less than or equal to 8 atom %.

9. The magnetic tape according to claim 1,
   wherein the nonmagnetic powder that is contained in the backcoat layer is nonmagnetic powder selected from the group consisting of carbon black and nonmagnetic inorganic oxide powder.

10. The magnetic tape according to claim 9,
    wherein the nonmagnetic powder contained in the backcoat layer comprises at least carbon black.

11. The magnetic tape according to claim 1,
    which comprises a nonmagnetic layer comprising nonmagnetic powder and binder between the magnetic layer and the nonmagnetic support.

12. A method of manufacturing a magnetic tape,
    wherein the magnetic tape comprises a magnetic layer comprising ferromagnetic powder and binder on one surface of a nonmagnetic support, comprises a nonmagnetic layer comprising nonmagnetic powder and binder between the magnetic layer and the nonmagnetic support, and comprises a backcoat layer comprising nonmagnetic powder and binder on the other surface of the nonmagnetic support,
    wherein the magnetic layer comprises one or more components selected from the group consisting of a fatty acid and a fatty acid amide;
    the backcoat layer has a thickness of less than or equal to 0.30 μm and comprises one or more components selected from the group consisting of a fatty acid and a fatty acid amide;
    a C—H derived carbon, C, concentration calculated from a C—H peak area ratio in a C1s spectrum obtained by X-ray photoelectron spectroscopy conducted at a photoelectron take-off angle of 10 degrees on a surface on the magnetic layer side of the magnetic tape, referred to as a magnetic layer side C—H derived C concentration, is greater than or equal to 45 atom %; and a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape, referred to as a backcoat layer side C—H derived C concentration, is greater than or equal to 35 atom %; and the method comprises formation of a nonmagnetic layer, formation of a magnetic layer, and formation of a backcoat layer; wherein the formation of a nonmagnetic layer further comprises:

coating a nonmagnetic layer-forming composition comprising one or more components selected from the group consisting of a fatty acid and a fatty acid amide, nonmagnetic powder, binder, and solvent on a surface of a nonmagnetic support to form a coating layer;

heating and drying the coating layer by a heat treatment; and cooling the coating layer after the coating but prior to the heating and drying; and the formation of a backcoat layer further comprises:

coating a backcoat layer-forming composition comprising one or more components selected from the group consisting of a fatty acid and a fatty acid amide, nonmagnetic powder, binder, and solvent on a surface of a nonmagnetic support to form a coating layer;

heating and drying the coating layer by a heat treatment; and cooling the coating layer after the coating but prior to the heating and drying.

13. The method of manufacturing a magnetic tape according to claim 12, wherein the cooling in the formation of a backcoat layer is conducted by placing the coating layer in a cooling atmosphere of −10° C. to 0° C.

14. The method of manufacturing a magnetic tape according to claim 12, wherein the solvent that is contained in the backcoat layer-forming composition comprises ketone solvent.

15. The method of manufacturing a magnetic tape according to claim 12, wherein the cooling in the forming of a nonmagnetic layer is conducted by placing the coating layer in a cooling atmosphere of −10° C. to 0° C.

16. The method of manufacturing a magnetic tape according to claim 12, wherein the solvent that is contained in the nonmagnetic layer-forming composition comprises ketone solvent.

* * * * *